United States Patent [19]

Posso

[11] 4,339,191
[45] Jul. 13, 1982

[54] MANEUVERING AND RELEASE DEVICE FOR CAMERA

[75] Inventor: Patrick P. Posso, Lausanne, Switzerland

[73] Assignee: GEFITEC S.A., Lausanne, Switzerland

[21] Appl. No.: 185,211

[22] Filed: Sep. 8, 1980

[30] Foreign Application Priority Data

Sep. 17, 1979 [FR] France .............................. 79 23144

[51] Int. Cl.³ ........................................... G03B 17/38
[52] U.S. Cl. .................................... 354/269; 354/293
[58] Field of Search .................. 354/81, 82, 269, 293; 352/179, 197, 243; 74/479, 501, 502

[56] References Cited

U.S. PATENT DOCUMENTS 2,498,137  2/1950  Ryder .................................. 354/293
2,584,067  1/1952  Turner ............................ 354/269 X

FOREIGN PATENT DOCUMENTS 850953   9/1939  France ................................ 354/269
2250441  5/1975  France ................................ 354/269

Primary Examiner—John Gonzales
Attorney, Agent, or Firm—James E. Nilles

[57] ABSTRACT

The present invention relates to a maneuvering and release device for camera, wherein a connecting piece is mounted to rotate about the rod near the handle and is adapted to be locked on the latter in any angular position from all the possible positions, and this connecting piece also forms a sheath for the assembly of the fixed sleeve of the push button controlling a release, this sheath extending at right angles to the rod. An axial assembly of this release is also possible due to the alignment of a channel in the handle with a hole in the connecting piece. The device of the invention is more particularly applicable to the aiming maneuver of a camera and to the release of the shutter.

4 Claims, 3 Drawing Figures

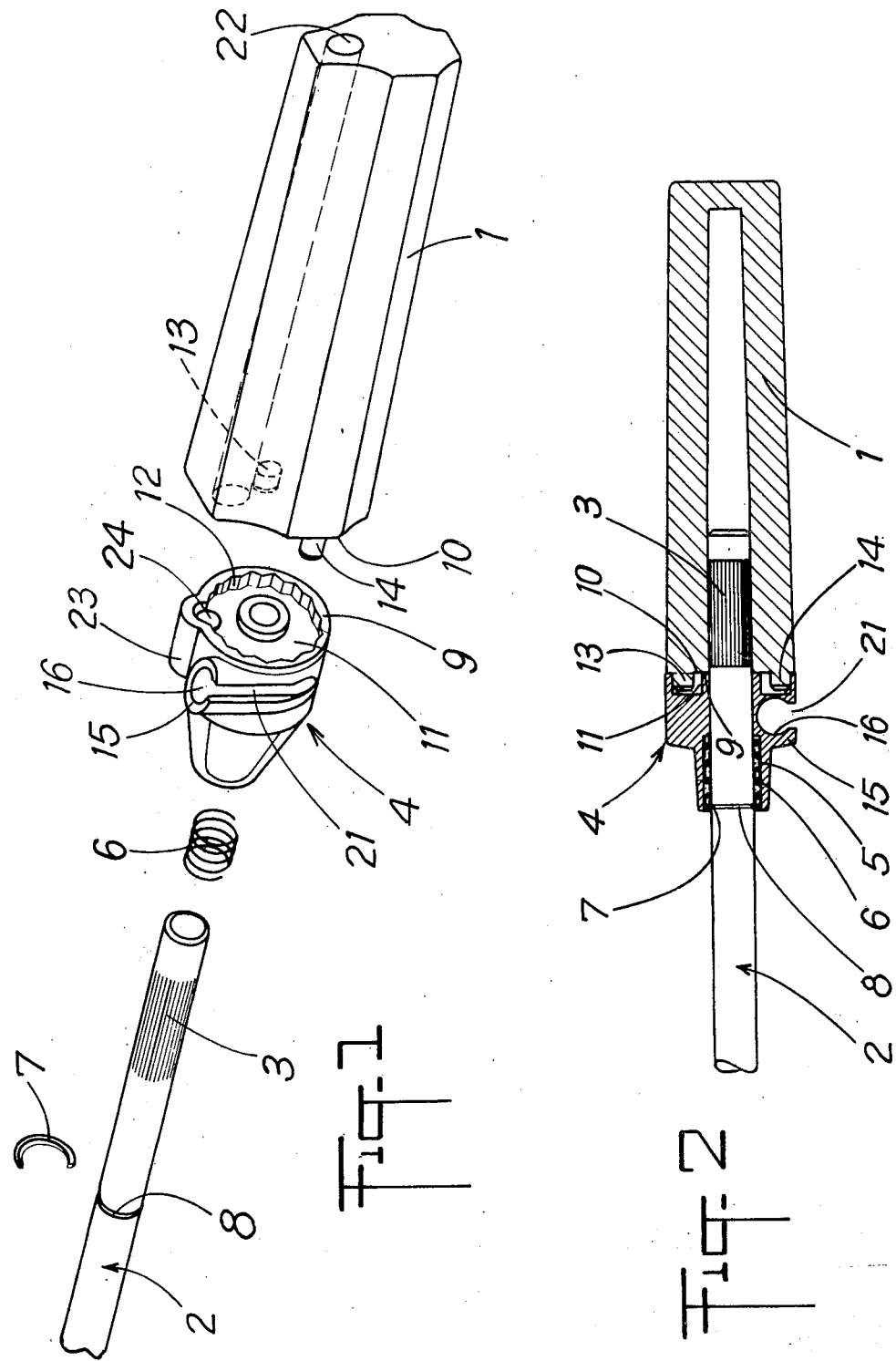

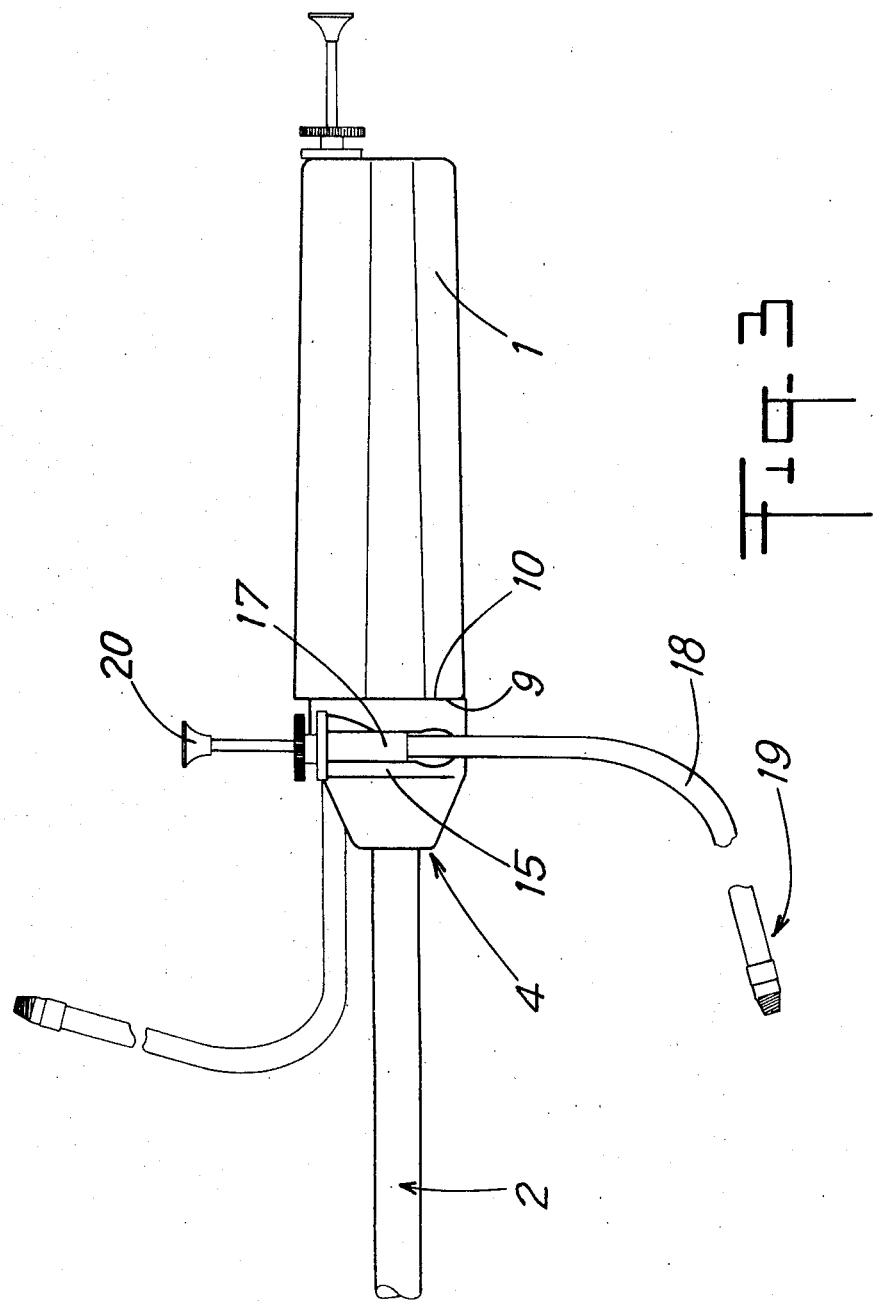

MANEUVERING AND RELEASE DEVICE FOR CAMERA

The present invention relates to a manoeuvring and release device for camera.

Up to the present day, such devices comprise a one-piece handle, fast with a manoeuvring rod adapted to be fixed to the camera and defining an axial passage for the flexible cable of a release.

It is obvious that the actuation of the push button controlling the release is convenient only when the handle's position is oriented upwardly. For all the other positions of shooting, the operator is hampered and must adopt a tactile grip of the handle which is detrimental to the freedom of movement, to the flexibility and rapidity of execution necessary for adjustments and focusing.

It is an object of the present invention to remedy this drawback by placing the push button controlling the release, relatively to the handle, in a position which is always easily accessible to and manoeuvrable by the operator, whatever the shooting position adopted and consequently whatever the orientation of the handle.

To this end, and according to the invention, a connecting piece is mounted to rotate about the rod near the handle, adapted to be locked thereon in any angular position from all that are provided and this connecting piece also forms a sheath for the assembly of the fixed sleeve of the push button controlling the release, this sheath extending at right angles to the rod.

Furthermore, the handle defining a channel substantially parallel to its axis for the passage of the flexible cable of the release, the connecting piece may advantageously be provided with a hole also parallel to the axis and adapted to be aligned with the said channel for the axial assembly of the release.

According to a particularly advantageous embodiment, the connecting piece is provided opposite the frontal face contiguous with this handle, an inner circular toothing whose notches are adapted to cooperate with at least one finger projecting from said face in order selectively to define the angular positions mentioned above. Moreover, a spring fitted on the rod and introduced in a housing in the connecting piece abuts on a flange of said rod, such as a circlip, to apply said connecting piece against the handle, the deformation of this spring corresponding to the axial stroke that the connecting piece must make for its toothing to escape the or each finger.

The invention will be more readily understood on reading the following description with reference to the accompanying drawings, in which:

FIG. 1 is a perspective view showing the preferred embodiment of the device of the invention in exploded form.

FIG. 2 is an axial section thereof, and

FIG. 3 is an elevational view.

Referring now to the drawings, the device comprises a handle 1 made of moulded plastics material and a metal manoeuvring rod 2 of which the end 3, opposite the end which is threaded for fixation on the camera, is channelled, grooved, guilloched or the like with a view to being rendered fast with said handle.

The device also comprises a connecting piece 4 made of plastics material, mounted to rotate and slide on the rod 2. At its free end, the connecting piece 4 defines a housing 5 in which is inserted a helical spring 6 abutting on an elastic ring 7, a so-called circlip, engaged in a groove 8 in said rod. The spring tends to apply the front face 9 of this connecting piece against the face 10 of the handle 1 located thereopposite; by compression, a momentary axial translation of the connecting 4 is also tolerated, due to which it becomes possible to disconnect said connecting piece from the handle 1 by spacing the faces 9 and 10 away from each other.

This connection is designed so that the connecting piece may occupy any angular position relatively to said handle, or at least any position from all the positions possible by construction.

In the example shown, the connecting piece 4 is provided with an annular hollow 11 in its front face 9, bordered by a peripheral circular toothing 12; this toothing defines a succession of V-shaped notches adapted selectively to cooperate, by contact, with at least one finger projecting from the front face 10 of the handle 1. In this example, two fingers 13 and 14 are provided which are positioned in the hollow 11 in the connecting piece when the faces 9 and 10 are in contact, or are located outside this hollow to escape the toothing 12 and allow the relative rotation of said connecting piece when the latter is spaced apart and compresses the spring 6.

Furthermore, the connecting piece 4 is provided with a sheath 15 fast therewith and extending tangentially and consequently at right angles to the rod 2. The sheath defines an internal passage 16 for the removable assembly of the fixed sleeve 17 fast with the flexible cable 18 of a release 19, in which sleeve is guided the control button 20 which actuates the flexible release cable.

To render assembly of the release in the connecting piece 4 easier and more rapid, the sheath 15 is preferably open and presents to this end a slot 21 whose width is at least equal to the diameter of the cable 18 and smaller than the diameter of the sleeve 17. Thus, to assemble the release at right angles with respect to the handle, it suffices to offer the cable opposite the slot 21, to introduce it into the passage 16 and to pull it to engage the sleeve 17 in said passage. Of course, in order to place the push button 20 in the best position with respect to the handle for each shooting action, it suffices to pull on the connecting piece 4, compressing the spring 6 to disconnect the fingers 13, 14 from the toothing 12, then to rotate this connecting piece around the rod 2 until it reaches the new angular position chosen and to release said connecting piece so that the connection is again in engagement, by translation.

However, the release may also be mounted in the device parallel to the rod 2. In fact, the handle 1 defines a channel 22 substantially parallel to its axis and the connecting piece 4 is provided, in a swell 23, with a hole 24 adapted to be aligned, in a particular angular position of this connecting piece, with the channel 22 for the passage of the release cable.

Thus, the device of the invention enables the release to be mounted in an axial position or in a plurality of tangential positions. To this end, it suffices that the connecting piece 4 may rotate about the rod 2 and be locked on the handle 1 whatever the angular position that it occupies. Consequently, the relative coupling of this connecting piece with this handle may be effected by any other suitable means, such as combined radial teeth on the faces 9 and 10 and a spring to displace the connecting piece elastically or a push button cooperating with a plurality of holes, or the like.

The invention is not limited to the embodiment shown, and described in detail as various modifications may be made thereto without departing from the scope thereof. It may be used for controlling an apparatus for aiming an objective and triggering off an operation; it is more particularly applicable to manoeuvring and release of a camera.

I claim:

1. A manoeuvring and release device for camera, comprising on the one hand a manoeuvring rod of which one end is provided with a means for fixation to the camera and the other end is rendered fast with a handle, a connecting piece being mounted to rotate about the rod near said handle, and on the other hand, a release accompanying the rod in its movements, wherein:

the connecting piece is provided, opposite the front face contiguous with this handle, with an inner circular toothing whose notches are adapted to cooperate with at least one finger projecting from said front face in order selectively to define angular positions of said piece relatively to said handle, and this connecting piece is also integral with a sheath for the assembly of a fixed sleeve of a push button controlling a release, this sheath extending at right angles to the rod to offer the push button in this direction.

2. A device as claimed in claim 1, defining a channel substantially parallel to the axis of the handle for the passage of the flexible cable of the release, wherein the connecting piece is provided with a hole likewise parallel to the axis and adapted to be aligned with said channel for the axial assembly of the release.

3. A device as claimed in claim 1, wherein a spring fitted on the rod and introduced into a housing in the connecting piece, abuts on a flange of said rod, on a circlip for example, to apply said conncting piece against the handle, the deformation of this spring corresponding to the axial stroke that the connecting piece must make for its teeth to escape each of said at least one finger.

4. A device as claimed in claim 1, wherein the sheath integral with the connecting piece is open and is provided to this end with a slot whose width is at least equal to the diameter of the release cable and smaller than the diameter of the fixed sleeve of the push button controlling the release.

* * * * *